E. N. HORSFORD.
COOKING APPARATUS.

No. 188,245. Patented March 13, 1877.

Attest:
E. E. Masson
W. R. Edelen

Inventor.
E. N. Horsford.

UNITED STATES PATENT OFFICE.

EBEN NORTON HORSFORD, OF CAMBRIDGE, MASSACHUSETTS.

IMPROVEMENT IN COOKING APPARATUS.

Specification forming part of Letters Patent No. 188,245, dated March 13, 1877; application filed February 23, 1877.

*To all whom it may concern:*

Be it known that I, EBEN NORTON HORSFORD, of Cambridge, in the county of Middlesex and State of Massachusetts, have invented a new and useful Improvement in Cooking Apparatus for soldiers and others, which improvement is fully set forth in the following specification and accompanying drawing:

The object of my invention is to provide a set of articles with which the soldier or miner may be able to cook and serve his food when wholly by himself, making him entirely independent of a mess, and so put together for convenient carriage as a case inclosing the canteen that the bulk shall be reduced to the lowest limit, and the liability to loss shall be slight, and I hereby declare the following to be a full description, reference being had to the accompanying drawings.

As the article of equipment longest retained by the soldier in his fatigue is the canteen containing his water or beverage, I collect about the canteen the necessary articles for cooking and serving his food, and so attach them that while they shelter the canteen from heat or abrasion, they can be most conveniently carried when all are together.

The articles consist of a fork and a spoon, one of the edges of which may be brought to an edge to serve as a knife, and two concave metallic pans, which are slightly irregular segments of hollow oblate spheroids, and which may be coated with porcelain glaze, to prevent rust, and which closely fit upon the canteen or similarly formed vessel, for carrying water or other beverage. These concave disks are provided with an interlocking hinge, one-half attached to one pan, and the other to the other, and also with catches, by which the two pans, having been locked together at the hinge, may be closed upon the canteen, covering it wholly except at the neck. On either side of the canteen, about a quarter round from the neck, is an eye, through which the strap for supporting the whole passes, crossing the lower half of the canteen on one side and the lower half on the other side before entering the eye, beyond which the two ends at proper length will be united, for slinging the whole over the shoulder. On one side of the canteen a flat fork is secured under a thin ledge attached to the canteen, the fork in shape corresponding to the curvature of the canteen. On the other side a spoon, similarly curved, is similarly secured.

Figure 3:
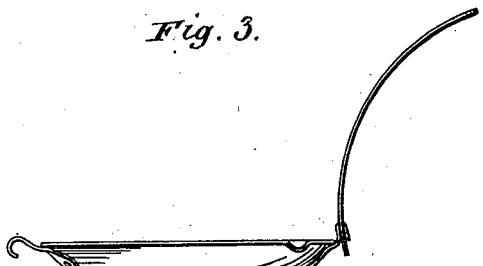
Figure 6:
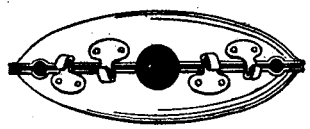

The fork and spoon have each a hole in the handle end, which may be attached to one of catches of either half cover, to constitute, as shown in Fig. 3, a frying-pan. Either half may serve as a plate or cup, or the two together for roasting or baking, as shown in Fig. 6.

Figure 1:
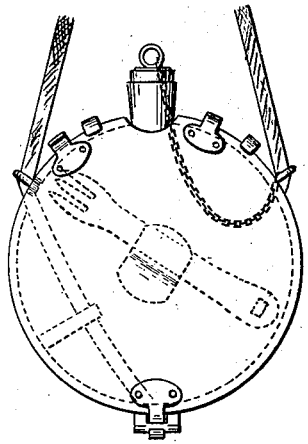
Figure 2:
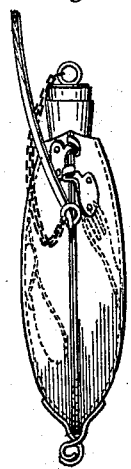
Figure 4:
Figure 5:
Figure 7:
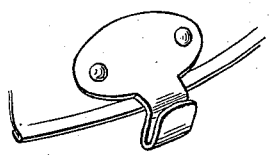
Figure 8:
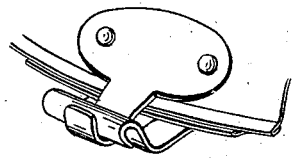

Figure 1 is a front view of the canteen-case, with the canteen seen in dotted outline within. The fork attached to the canteen, as described above, is shown in dotted outline, together with the suspending-strap passing across the lower half of the canteen on one side. The catches and hinge are presented, the former on either side of the neck, and the latter opposite the neck. The catches also serve as buttons for attaching the fork or spoon, as above described. Fig. 2 is a side view of the canteen-case closed upon the canteen. Fig. 3 is one of the shells and the spoon or fork, used as a handle, the whole constituting a frying-pan. Fig. 4 is the fork, and Fig. 5 the spoon. Fig. 6 shows the two shells closed without the canteen, as when used for baking bread or for roasting coffee or parching corn. Fig. 7 is one of the catches, and Fig. 8 shows the locking-hinge on a scale of natural size.

I claim and desire to secure by Letters Patent—

1. The combination, with a canteen of otherwise usual form and construction, of detachable conforming shells, which may serve the purpose of frying-pans or receptacles for liquid or solid matter.

2. The combination, with a canteen and conforming shells, as described, of a fork and spoon, curved in the manner set forth, so as to conform with the shape of the shells, the fork and spoon being adapted to serve as handles for the inclosing shells, substantially as herein shown.

3. The shells provided with the clasps and hinge, and adapted to inclose a canteen, substantially as described.

E. N. HORSFORD.

Witnesses:
E. E. MASSON,
E. C. WEAVER.